Aug. 4, 1953
R. F. OSTRANDER
2,647,328
TIME-SERVICE CONTROL APPARATUS FOR
AUTO SERVICE STATIONS AND THE LIKE
Filed Dec. 22, 1950
4 Sheets-Sheet 1
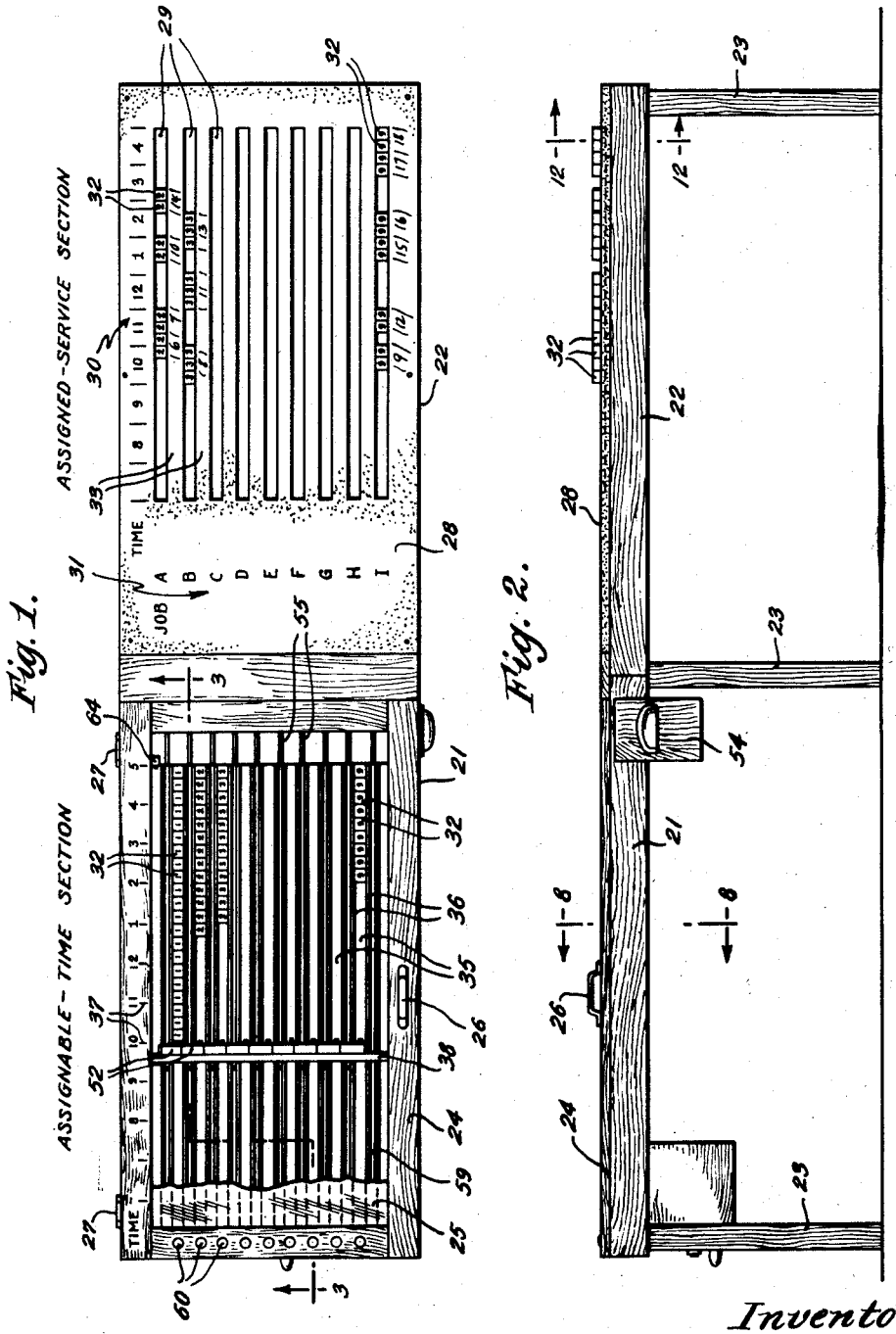
Inventor,
Robert F. Ostrander,
by Thomson & Thomson
Attys.

Aug. 4, 1953
R. F. OSTRANDER
2,647,328
TIME-SERVICE CONTROL APPARATUS FOR
AUTO SERVICE STATIONS AND THE LIKE
Filed Dec. 22, 1950
4 Sheets-Sheet 2
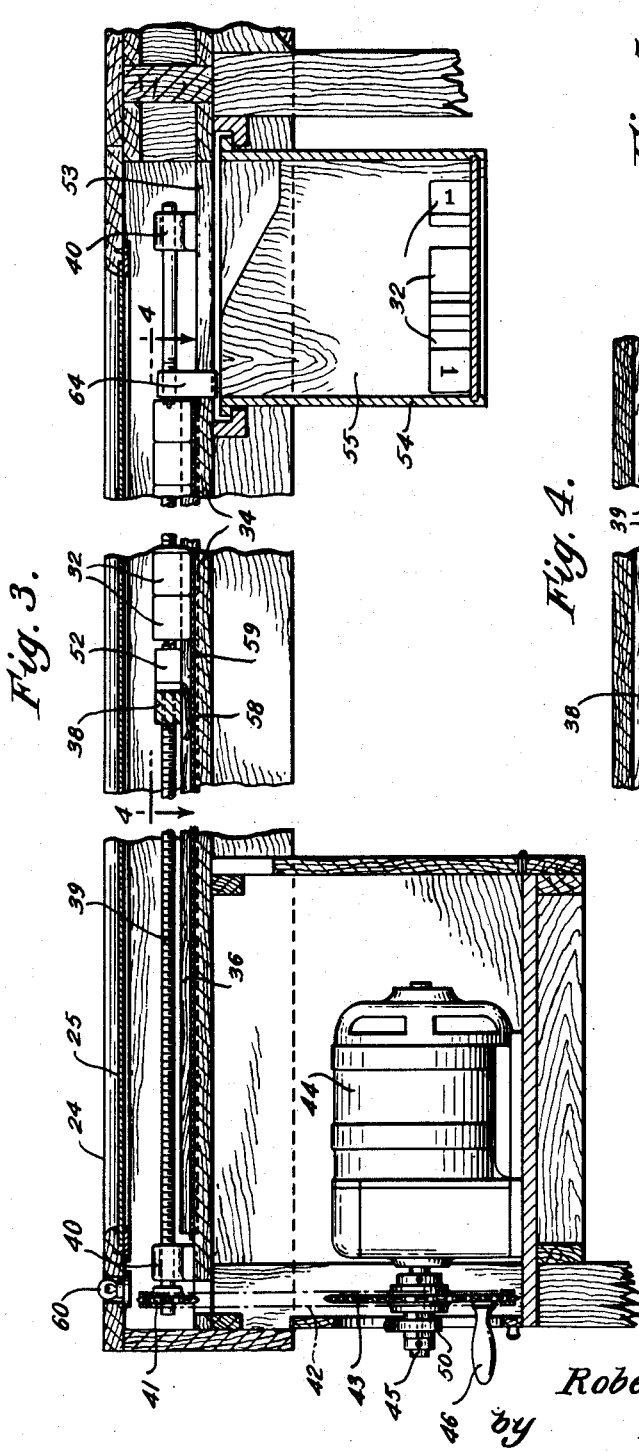
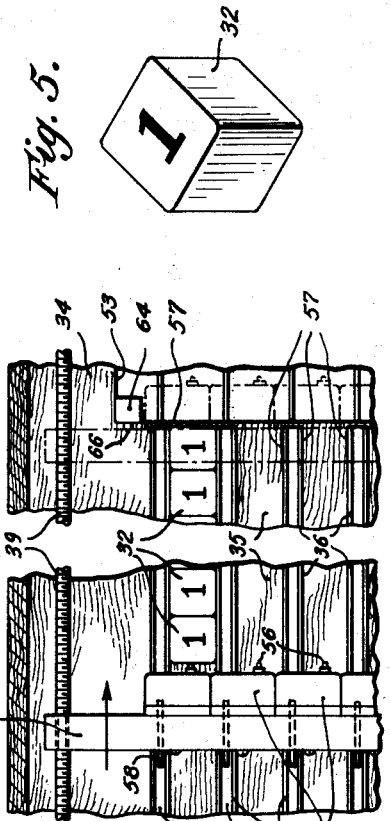
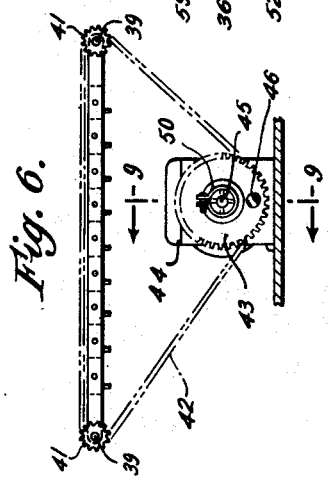
Inventor,
Robert F. Ostrander,
by
Attys.

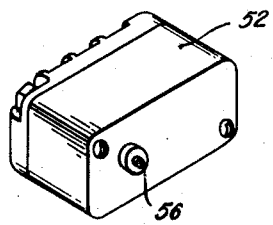
Fig. 7.
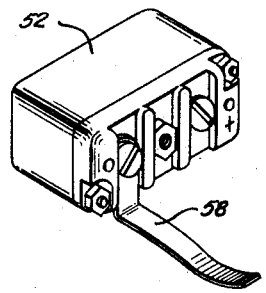
Fig. 7.a
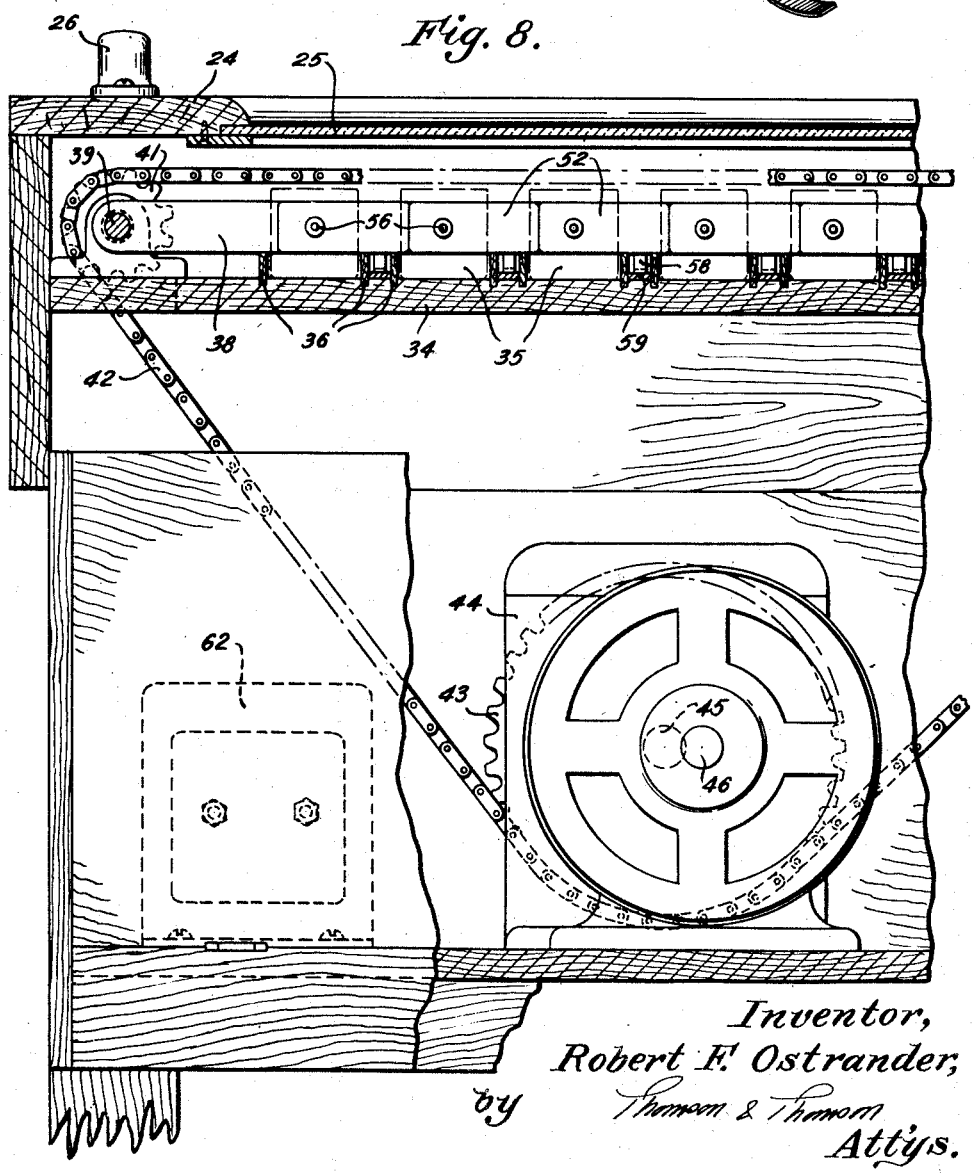
Fig. 8.
Inventor,
Robert F. Ostrander,
by Thomson & Thomson
Att'ys.

Inventor,
Robert F. Ostrander,
Thomson & Thomson
Att'ys.

Patented Aug. 4, 1953

2,647,328

UNITED STATES PATENT OFFICE 2,647,328

TIME-SERVICE CONTROL APPARATUS FOR AUTO SERVICE STATIONS AND THE LIKE

Robert F. Ostrander, Woodbridge, Conn.

Application December 22, 1950, Serial No. 202,291

5 Claims. (Cl. 35—24)

This invention relates to time-service control apparatus for use in motor vehicle service stations and the like, and pertains more particularly to a duplex display chart adapted to be incorporated in or mounted on a table or other support, in an auto service station, and operated by the service manager or a clerk, for automatically indicating at any time of the day the unassigned time of each workman, and visually indicating the work allocated for the day, at any particular time, and the workman assigned to the respective jobs.

The principal purpose of the invention is to provide a simple, efficient, and easily operated time and service control chart or board which will enable the service manager, the employees and the employer to tell at a glance, at any moment during the day, just what jobs have been allocated for the balance of the day in each department, the particular workman who has been assigned to each job, the time period in which each job is to be completed, and the time periods which are available for allocation of additional jobs in each department before the close of the working day.

Another object is to provide a control board of this type on which the unit work periods of each employee are indicated on a plurality of movable, indexed blocks or the like, which are initially placed in parallel rows in an assignable-time section of the duplex control board, and which are selectively removable by the operator to the assigned-service section of the board, whereby the assigned and unassigned time of each mechanic or workman is visually indicated at any moment during the day.

A further object is to equip the assignable-time section of the visual control board with time-controlled mechanism comprising a cross member moving continuously along the board toward the blocks thereon and engageable with some of the blocks under certain conditions to move the forwardmost blocks off the board. Such mechanism may also be associated with electric signal circuits for automatically actuating lights or other signals, located either at the board or preferably at the employer's office, to indicate whenever any workman's time is unassigned for the balance of the working day, as represented by the number of his indexed blocks remaining on that section of the board. Such mechanism is preferably designed to move such remaining blocks off the board and into a receptacle, so that the total unassigned time units of each workman may be counted at the end of the day.

Additional novel features of the time-service control apparatus will be apparent from the following description of the recommended embodiment of this invention illustrated in the accompanying drawings, and will be pointed out in the appended claims. It will be understood, however, that the structural details of the apparatus herein shown and described may be varied to suit particular purposes and shop conditions without departing from the essence of the invention as set forth in said claims.

The use of the control board herein disclosed is most beneficial to the operator of a service station, the service manager who is responsible for the allocation of jobs and assignment of workmen, the mechanics or workmen and the customers of the station; for all of the shop personnel can tell at any time what work has been allocated in each department, what time periods are available for allocation of further jobs, which workmen have been assigned for designated time periods and which are available to assignment at other time periods, and the customer will know when his car can be serviced and when it will be delivered. The service manager is kept informed of the operating status of the station at all times; workmen know their future as well as immediate assignments, and are encouraged to recommend additional service which may appear necessary on each car, to fill unalloted time on their department or in other departments; and, more particularly, the management may be periodically informed of the shop situation, and is automatically informed when workmen are idle and unassigned.

Thus, the servicing of cars is performed more smoothly, efficiently, economically and profitably; and the permanent records of data taken daily from the control board present a clear picture of all shop operations, and enable management accurately to decide when the working staff should be increased or decreased, in particular departments, and what other steps should be taken for greater efficiency of operations and better utilization of employees' time.

In the drawings of the embodiment chosen for the purpose of illustration herein:

Fig. 1 is a plan view of the time-service control board at 10 a. m. of a typical working day, the position of the time-unit blocks of four selected workmen only being shown in hypothetical positions;

Fig. 2 is a front elevation of the board;

Fig. 3 is an enlarged, fragmentary section of the assignable-time section of the duplex control board, taken on line 3—3 of Fig. 1;

Fig. 4 is a fragmentary section on line 4—4 of Fig. 3;

Fig. 5 is an enlarged perspective of one of the workman's time-unit blocks shown in Figs. 1, 3 and 4;

Fig. 6 is a diagrammatic end view of the time-controlled mechanism shown in Fig. 3;

Fig. 7 is an enlarged perspective of one of the switch members shown in Figs. 3 and 4;

Fig. 7a is a similar perspective of the opposite side of the switch member;

Fig. 8 is an enlarged, fragmentary section on line 8—8 of Fig. 2;

Figure 9:
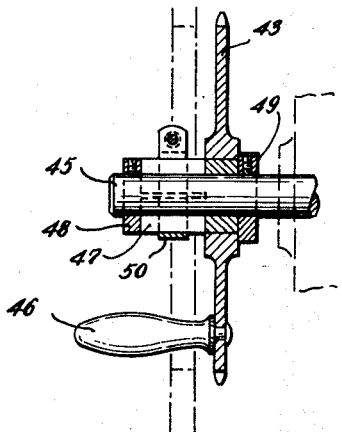
Fig. 9 is an enlarged detail section of a sprocket gear, bushing and gear shaft, shown in Figs. 3 and 6.
Figure 10:
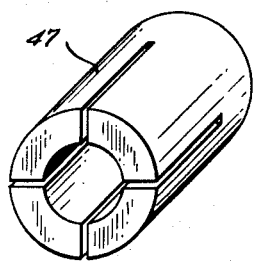
Fig. 10 is an enlarged perspective of a spit bushing shown in Fig. 9.
Figure 12:
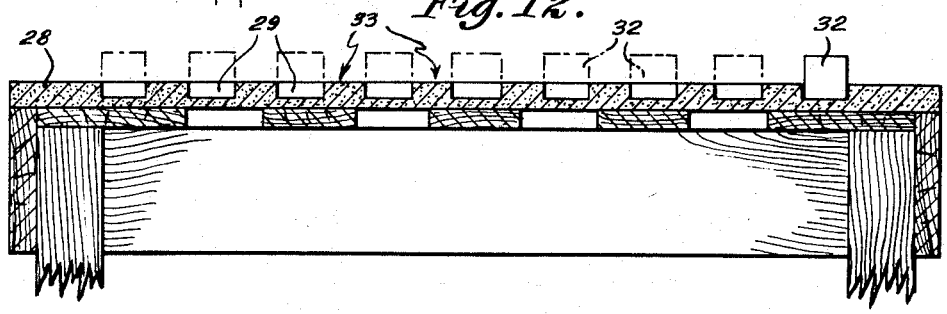
Fig. 12 is an enlarged section through the assigned-service section of the board, taken on line 12—12 of Fig. 2.

In the particular form shown in the drawings, the duplex control board is fashioned as a flat table, including the table sections 21 and 22, supported on legs 23, the left hand portion of the table constituting the assignable-time section of the board or chart and the right hand section 22 constituting the assigned-service section. Section 21 is preferably provided with a hinged cover 24 equipped with a glass pane 25, and having a handle 26 by which the cover may be raised on the hinges 27. The top 28 of section 22 is preferably formed of slate or other blackboard material having a surface on which letters or numerals may be written with chalk or crayon; and the top 28 has a series of longitudinal slots 29 forming channels or block-receiving spaces.

One longitudinal margin of the top 28 of the assigned-service section is marked with a line of time indications 30, disposed above the rows of channels 29 and visually dividing the channel space into longitudinal time zones according to the hours of the working day, as shown in Fig. 1. One transverse margin of said top 28 provides a space for inscriptions indicating the department or type of job for which work may be allocated by placing blocks in the respective channels 29, as hereafter described. As shown at 31 in Fig. 1, the departments may be designated by the letters A to I inclusive; and said letters may indicate the following departments or types of service: lubrication, motor tune-up, transmission, clutch, brakes, motor cooling system, waxing or polishing, and washing, when the control board is used in an average-sized automobile service station. Obviously, the assigned-service section of the board may have other work designations, corresponding to the shop departments or types of services rendered; and the number of the channels 29 will correspond to the number of departments or job types designated on the space 31 of the "blackboard" top.

The index blocks receivable and slidable in the channels 29 may consist of cubical wooden blocks 32, one or more surfaces of which bear numerals, letters, or other index symbols, designating respectively an individual mechanic or workman at the service station. Fig. 1 shows movable index blocks identifying four workmen by the numbers 1, 2, 3, and 9, respectively, on the upper surface of the blocks. As will be apparent, the illustrated control board is designed to accommodate a number of blocks for each of the nine workmen who may be assigned to nine different departments, according to the type of job for which they are most experienced and the time period during which a particular job is to be performed during the working day.

The work is allocated and jobs are assigned to particular workmen by the service manager of the station, who selects a number of blocks identifying the workman who will perform each job, and places them in the particular channel 29 which designates the department or type of job, immediately below the designated time period during which the work is to be performed. As here shown, each block 32 is of a size to define a time unit of twenty minutes, so that three abutting blocks occupy the space of one hour when placed in one of the channels beneath the time zone 30 of the assigned-service section. For example, if it be assumed that a lubrication job takes 40 minutes and that two such jobs are to be performed successively by workman No. 2, commencing at 10:40, four blocks bearing the number 2 are placed in the channel A, as shown in the central portion of that channel in Fig. 1, below the pertinent portion of the time zone 30. Other jobs are assigned to the same workman or to other workmen, and the appropriate blocks are placed in the appropriate portions of the channel 29, as soon as a job is ready for allocation and assignment.

The strips 33 of blackboard surface, disposed between the spaced parallel channels 29, afford spaces for marking in chalk or crayon a symbol designating the automobile on which work is to be performed. In the illustration above given, for example, the two cars which are to be lubricated by workman No. 2, between 10:40 and 12 noon, are designated by the numbers (6) and (7), respectively, written on the top strip 33 immediately below the blocks placed in the top channel 29 of the board. A corresponding number is customarily written on a card placed in or on the automobile, for example, inside the rear window, so that the job may be followed through the shop by observing the number on the car card or ticket, and the data on the assigned-service section of the control board.

As soon as a job has been finished, the blocks placed in the channels 29 may be manually removed by the identified workman and placed in a box or drawer for re-allocation and assignment on the following day. The workman then picks up his next job, and the board shows that the prior job has been finished.

The assigned-service section thus enables the service manager, the employees, and the operators of the service station to obtain a clear picture of the status of the work being performed and to be performed in the service station, at any moment of the working day.

The assignable-time section 21 of the control board is designed to visually indicate the unassigned time of each workman, as shown by the blocks remaining in said section at any particular moment; and preferably also to signal the operator of the board or the management of the service station at the moment when any workman has unassigned time for the remainder of the day. To this end, the table top 34 of section 21, beneath the hinged cover 24, is divided into rows of parallel longitudinal channels 35 by a series of wooden guide strips 36 mounted vertically in spaced parallel relation on the top 34, as by securing the bottom edges of the guide strips in longitudinal slots of said top (Fig. 8). On one longitudinal margin of the cover 24, time zones are indicated by the line of markings 37 which correspond to the markings 30 of the assigned-service section. Prior to the allocation and assignment of work for the day all of the numbered blocks 32 are normally placed in the channels 35 of the assignable time section, and selected blocks are removed from said section and placed in the channels 29 of the assigned-service section when jobs are allocated, as aforesaid. Hence, any blocks remaining in the assignable time section show which workmen have unassigned time and the amount of unassigned time of each workman, according to the number of the blocks remaining in his channel.

The time service control board may be operated to advantage without additional mechanical features, but it is preferred to incorporate in the assignable time section, time-controlled means for moving blocks along the board and, when desired, actuating a signal as soon as any workman has unassigned time for the balance of the working day.

For this purpose, a transverse bar 38 is arranged to be moved over the channels 35 and guide strips or partitions 36, the upper portion of the blocks located in said channels projecting above the upper edges of said guide strips and being disposed in the path of movement of the bar 38 which serves as a pusher means, preferably operated mechanically but obviously operable manually if desired, for sliding the blocks remaining in the channels beyond the ends thereof. The ends of said bar are apertured to receive and engage threaded shafts 39 extending longitudinally above the table top 34 and beneath the margins of the closed cover 24, so that the bar 38 is supported and moved longitudinally of the table by rotation of the said shafts 39 which are journaled at their opposite ends in bearings 40. Complemental ends of the shafts 39 carry sprockets 41, and a drive chain 42 engages said sprockets and the driving gear 43 of an electric motor 44 which preferably has reduction gearing between the gear shaft 45 and the motor shaft 46. The motor 44 is a synchronous electric motor so that movement of the driving gear is time-controlled; and the timing of the driving elements for the shafts 39 are so adjusted that said shafts move the bar 38 slowly along the table of the assignable time section of the board, at such a rate that the bar moves from one hour mark to the next hour mark of the time zone 37 in sixty minutes. Hence, if the working day starts at 8 o'clock the motor is started when bar 38 has been manually moved to register with the 8 o'clock mark of said time zone.

Driving gear 43 is preferably connected to drive shaft 45 by manually adjustable clutch means, so that the gear may be manually rotated, as by the handle 46, to set the bar 38 in any desired position when the driving clutch is released. The clutch means may comprise a slotted bushing 47 disposed between the hub of gear 43 and shaft 45, and having a drive fit in the gear hub. The bushing may be retained in position on the shaft, for rotation thereon when free, by collars 48 and 49, suitably fastened to the shaft at opposite ends of the bushing. The radially slit portion of the bushing projects from one side of the gear hub, and is engaged with shaft 45 by manually tightening a strap clamp 50 around said projecting portion. The motor 44 may be connected in a power circuit 51, closed in a conventional manner by a manual switch indicated at 51a in Fig. 11.

Hence, when the clutch 47—50 is engaged, and the motor is started, gear 43 drives chain 42 and, through the sprockets 41, rotates the threaded shafts 39 to move the bar 38 along the assignable time board and over its channels 35, in timed relation to the spacing of the markings of the time zone 37, toward any blocks 32 which are disposed in said channels. As shown in the drawings, the forward face of the bar is provided with a row of micro switches 52 (for a purpose to be described) but such switches may be omitted if a signalling circuit is not desired in connection with the operation of the control board. The bar 38 or any attachment on its forward face, is arranged as aforesaid to engage and move any blocks met thereby during its movement along the board, so that such blocks are slid toward the ends of the channels in which they are located. When a channel is filled with blocks (as indicated by the number 1 blocks of Fig. 1), the endmost block in the row will be pushed beyond the end of the channel as the bar continues its movement. The table top 34 has a transverse opening 53, at the discharge ends of the channels 35, and a drawer 54 is mounted to slide under the table below said opening, as best shown in Fig. 3. Said drawer hay have transverse partitions 55 defining compartments in which the blocks falling into the drawer may be separately collected. The blocks thus deposited in the respective compartments may be counted at the end of the day, in compiling a record of the lost time of the respective workmen.

The provision of the movable bar 52 also serves to present a visual indication of the potential labor available at any selected time during each working day; for the blocks remaining in the channels 35 ahead of the bar 38 represent the number of time units which may be assigned during the balance of the day. Such blocks also show which workmen have the most unassigned time, at any moment, so that such workmen may be utilized for miscellaneous jobs at the station.

The signalling system associated with the moving bar 38 of the assignable-time board is actuated by the micro switches 52 which have forwardly directed push buttons 56, engageable with any blocks in the path of movement of such buttons. A separate switch is provided for each of the channels 35, and the switch buttons 56 are so disposed that they pass over the approximate center of said channels. The blocks 32 are freely slidable in the channels 35, except at the channel ends adjacent the opening 53, so that an isolated block contacted by the switch button 56 will be slid along the channel without actuating the switch, until such block reaches the end of the channel or meets a row of other blocks reaching to the end of the channel. Friction members are preferably disposed in or adjacent said channel ends, to retard movement of the blocks located at said channel ends and prevent them from freely sliding into the drawer 54, until forced therein by movement of the bar 38. As shown in Fig. 4, the inner surfaces of the guide strips defining each channel are provided adjacent their ends with felt strips 57, which frictionally engage the sides of the blocks disposed at the ends of the respective channels. Other types of friction members may obviously be utilized for this purpose, whereby any blocks retarded by such friction members present sufficient resistance to the progressive forward movement of bar 38 to depress such switch buttons 56 as strike a row of juxtaposed blocks, and thus actuate one or more of the switches 52. As shown in Figs. 1 and 4, for example, the number 1 blocks are juxtaposed and fill the channel between its discharge end and the button of the switch disposed over that channel, so that engagement of the button against the rearwardmost block of the row will actuate the switch, and further movement of the bar will force the forwardmost block beyond the channel end and into the underlying drawer, while holding the switch button constantly closed.

The micro switches 52 may be of standard construction and operation. One of the terminals at the rearward side of the switch (Fig. 7a) is provided with a spring contact strip 58 which slidably engages a conductor bar 59 disposed on the table top 34 between a pair of guide strips 36 intermediate the respective channels 35. As shown in Fig. 3, the contact strips 58 may underlie the bar 38. A conductor strip is provided for each of the channels 35 and the respective strips are connected in the circuits of a series of signal lights 60 arranged along the free end of the assignable time section of the control board. Such light circuits may also include a signal light panel 61 located at a point remote from the control board, for example, in the office of the operator of the service station; and the circuit may also comprise, if desired, tape-recording mechanism (not shown) responsive to the signal circuits. The precise character and construction of the signalling devices, whether lights, buzzers or recorders, are not material to this invention.

Figure 11:
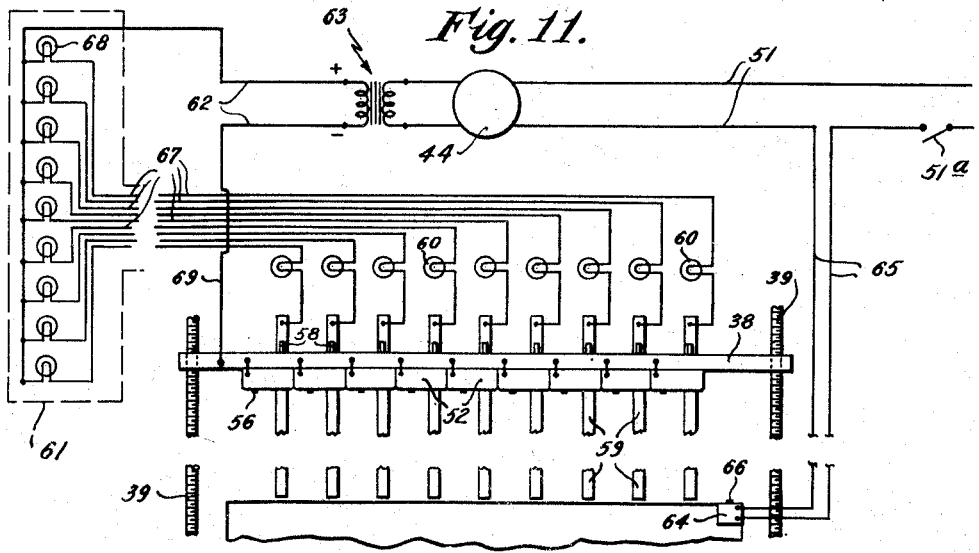
Fig. 11 is a diagram of the signal circuit and control mechanism of the assignable-time section of the control board.

As shown in Fig. 11, the signal circuit 62 may be associated with the power circuit 51 for motor 44, with an intervening, step-down transformer 63. An automatic cut-out switch 64, connected in the power line as by wires 65, is preferably provided to shut off the power and signal circuits, when the moving bar 38 reaches the end of the time zone 37. Switch 64 may be a conventional microswitch provided with an actuating button 66 (Fig. 4) similar to the push buttons 56 of switches 52. The latter switches are designed so that the signal circuit is closed when buttons 56 are depressed; whereas the cut-out switch is designed to open when its button 66 is depressed. Switch 64 may be located in the opening 53 of table 34, at one side of the outermost block channel, with the button 66 disposed in the path of movement of bar 38. Hence, when the moving bar reaches the cut-out switch, button 66 is engaged and depressed by the bar, thereby opening the power circuit and automatically shutting off motor 44 and the signal circuit 62.

The signal circuit 62 has a number of branch lines 67 leading to the respective lights 60 on the control board and, as shown in Fig. 11, said branch circuits also include a battery of auxiliary lights 68 respectively in series with lights 60. The lights 68 are preferably disposed at a remote station, for example at the office of the operator of the service station; and it will be understood that the remote light signals may be substituted by buzzers or other signalling devices, such as a time recorder of conventional type. It will also be understood that the respective sets of signals may be arranged in parallel, if desired, rather than in series as illustrated for simplicity.

One terminal of each light 60 is connected to the respective leads 67, and the other terminal thereof is connected as shown to one of the conductor bars 59. The signal circuit is completed through the respective contact strips 58 sliding on said bars, the respective microswitches 52 to one terminal of which said strips are respectively connected, and the moving bar 38 which constitutes a common ground for the several switches 52 and to which the flexible return wire 69 of circuit 62 is suitably connected. As previously indicated, the details of the electrical and mechanical devices in the signal circuit are not of the essence of this invention, and may obviously be constructed and arranged as desired.

A time-service control board constructed and operated as above described is most efficient when it comprises the associated assigned-service section and the assignable-time section shown in the drawings. It will be appreciated, however, that the two sections may be installed separately, if desired, and that either section may be independently utilized to furnish the information which each section is adapted to display. When used in conjunction, the two sections show, at any moment of the working day, the potential labor available for assignment to jobs, and the jobs which have been assigned for each workman, the time-periods of the assignments, and the departments in which work has been allocated for each car to be serviced.

Moreover, the automatically operated assignable-time section keeps track of the lost hours of each workman, and the signalling system associated therewith notifies the service manager and the station operator whenever any workman has no assigned time for the balance of the day; and the utilization of an optional tape recorder automatically records the lost time of the respective workmen.

I claim:

1. Time-service control apparatus for service stations, comprising a display board having an assignable-time section, a plurality of removable blocks having indices thereon respectively designating each of a group of workmen at the service station, said section being provided with a line of time-period designations and a plurality of rows of block-receiving spaces extending substantially parallel to the time-period line, each of said rows slidably receiving blocks designating an individual workman, and said blocks being of a size to define a predetermined time-unit with relation to said time-period line, whereby the available time of any designated workman may be determined by inspection of the blocks disposed on said assignable-time section, and pusher means extending transversely of the said rows of spaces and movable thereover to meet certain of the blocks in one or more of the rows and to slide the blocks remaining in said rows toward the ends thereof, and time-controlled means for continually moving said pusher means longitudinally of the display board.

2. Time-service control apparatus as described in claim 1, said assignable-time section having guide walls defining parallel longitudinal channels constituting the rows of block-receiving spaces thereon, said blocks being slidable in rows along the respective channels, and having a receptacle at the forwardmost ends of said channels for receiving individual blocks successively moved beyond said channel ends as they fall into said receptacle.

3. Time-service control apparatus as described in claim 1, said assignable-time section having guide walls defining parallel longitudinal channels constituting the rows of block-receiving spaces thereon, said blocks being slidable in rows along the respective channels, and having a receptacle at the forwardmost ends of said channels for receiving individual blocks successively moved beyond said channel ends as they fall into said receptacle, said pusher means comprising a bar extending transversely of said channels and movable longitudinally thereover, portions of the blocks in said channels being disposed in the path of movement of said bar, whereby the engagement of a part of said bar with the rearwardmost block of a row of juxtaposed blocks in any channel slides said row toward said receptacle.

4. Time-service control apparatus as described in claim 1, said assignable-time section having guide walls defining parallel longitudinal channels constituting the rows of block-receiving spaces thereon, said blocks being slidable in rows along the respective channels, and having a receptacle at the forwardmost ends of said channels for receiving individual blocks successively moved beyond said channel ends as they fall into said receptacle, said pusher means comprising a bar extending transversely of said channels and movable longitudinally thereover, portions of the blocks in said channels being disposed in the path of movement of said bar, whereby the engagement of a part of said bar with the rearwardmost block of a row of juxtaposed blocks in any channel slides said row toward said receptacle, said time-controlled means comprising an electric motor, and a cut-out switch located on said section and having an actuating button engageable by the moving bar for opening the circuit of said motor when said button is engaged by the bar.

5. Time-service control apparatus as described in claim 1, said assignable-time section having guide walls defining parallel longitudinal channels constituting the rows of block-receiving spaces thereon, said blocks being slidable in rows along the respective channels, and having a receptacle at the forwardmost ends of said channels for receiving individual blocks successively moved beyond said channel ends as they fall into said receptacle, said pusher means comprising a bar extending transversely of said channels and movable longitudinally thereover, portions of the blocks in said channels being disposed in the path of movement of said bar, whereby the engagement of a part of said bar with the rearwardmost block of a row of juxtaposed blocks in any channel slides said row towards said receptacle, said time-controlled means being operative to move said bar over said channels, said bar carrying a plurality of electric switches, each switch having an actuating button directly engageable with the rearwardmost block of each row of juxtaposed blocks in the respective channels, a group of signals, associated electric circuits each including a signal and a complemental switch, and means at the forwardmost ends of said channels for frictionally restraining movement of the blocks beyond said ends, whereby the engagement of the switch button with such rearwardmost block actuates the signal and also pushes the row of blocks along their channel.

ROBERT F. OSTRANDER.

References Cited in the file of this patent

UNITED STATES PATENTS

| Number | Name | Date |
|---|---|---|
| 1,268,613 | Radebaugh | June 4, 1918 |
| 1,340,216 | Diepenbrock | May 18, 1920 |
| 1,611,274 | Larson | Dec. 21, 1926 |
| 1,776,842 | Reinicke | Sept. 30, 1930 |
| 2,234,249 | Hanford | Mar. 11, 1941 |

FOREIGN PATENTS

| Number | Country | Date |
|---|---|---|
| 384,882 | Germany | Nov. 6, 1923 |
| 449,015 | Great Britain | June 15, 1936 |
| 902,684 | France | Sept. 10, 1945 |
| 919,346 | France | Mar. 5, 1947 |